（12） United States Patent
Abrams et al.

(10) Patent No.: US 9,736,231 B1
(45) Date of Patent: Aug. 15, 2017

(54) REPRESENTATIONAL STATE TRANSFER REQUEST ROUTING

(71) Applicant: INTERNATIONAL BUSINESS MACHINES CORPORATION, Armonk, NY (US)

(72) Inventors: Robert M. Abrams, Wappingers Falls, NY (US); Victor G. Alonzo, Wappingers Falls, NY (US); Yuk L. Chan, Rochester, NY (US); Gisela C. Cheng, Rhinebeck, NY (US); Kin Ng, Wappingers Falls, NY (US); Vaughn C. Page, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/273,994

(22) Filed: Sep. 23, 2016

(51) Int. Cl.
| | | |
|---|---|---|
| *G06F 15/16* | (2006.01) | |
| *H04L 29/08* | (2006.01) | |
| *H04L 12/715* | (2013.01) | |
| *H04L 12/751* | (2013.01) | |
| *G06F 11/20* | (2006.01) | |
| *G06F 11/26* | (2006.01) | |

(52) U.S. Cl.
CPC ...... *H04L 67/1002* (2013.01); *G06F 11/2023* (2013.01); *G06F 11/261* (2013.01); *H04L 45/02* (2013.01); *H04L 45/64* (2013.01); *H04L 67/02* (2013.01); *H04L 67/2842* (2013.01)

(58) Field of Classification Search
CPC . H04L 67/02; H04L 67/1097; H04L 67/2842; G06F 11/2023; G06F 11/261
See application file for complete search history.

(56) References Cited

U.S. PATENT DOCUMENTS

| | | |
|---|---|---|
| 6,161,196 A | 12/2000 | Tsai |
| 6,910,153 B2 | 6/2005 | Kapulka et al. |
| 7,685,272 B2 | 3/2010 | Bansod et al. |
| 8,635,391 B2 | 1/2014 | Kawaguchi |
| 8,872,160 B2 | 10/2014 | Radosavljevic et al. |
| 8,924,656 B1 | 12/2014 | Usgaonkar et al. |
| 9,032,488 B2 | 5/2015 | Lee |
| 9,160,666 B2 | 10/2015 | Allan et al. |

(Continued)

OTHER PUBLICATIONS

Ulbrich, Peter, et al. "Eliminating Single Points of Failure in Software-Based Redundancy," 2012, Ninth European Dependable Computing Conference, pp. 49-60.

(Continued)

*Primary Examiner* — Chirag R Patel
(74) *Attorney, Agent, or Firm* — Cantor Colburn LLP; Joe Petrokaitis

(57) ABSTRACT

Examples of techniques for routing a representational state transfer (REST) request among a plurality of virtual processing systems are disclosed. In one example implementation according to aspects of the present disclosure, a computer-implemented method may include: receiving, at a load balancer, the REST request; assigning, by the load balancer, the REST request to one of a plurality of web servers, each of the plurality of web servers executing on a virtual processing system; routing, by the one of the plurality of web servers, the REST request to one of the plurality of virtual processing systems; and storing, by the one of the plurality of web servers, state information regarding the REST request to a data store.

20 Claims, 6 Drawing Sheets

(56) References Cited

U.S. PATENT DOCUMENTS

2011/0106974 A1    5/2011  Brabson
2013/0227558 A1    8/2013  Du et al.
2014/0208167 A1    7/2014  Krampen et al.

OTHER PUBLICATIONS

Lin, Cheng-Han et al. "R-SPOFTR: Relieving Single Point of Failure in Tree Routing to Prolong Sensor System Lifetime," 2015 IEEE, pp. 283-288.
List of IBM Patents or Patent Applications Treated as Related; Date Filed Oct. 6, 2016, pp. 1-2.
Robert M. Abrams, et al., "Invoking a Restricted Access Service Through a Restful Interface", U.S. Appl. No. 15/274,032, filed Sep. 23, 2016.
Robert M. Abrams, et al., "Providing Highly Available and Scalable Access to a Restricted Access Service Through a Restful Interface" U.S. Appl. No. 15/274,059, filed Sep. 23, 2016.

REPRESENTATIONAL STATE TRANSFER REQUEST ROUTING

BACKGROUND

The present disclosure relates generally to computer processing systems and, more specifically, to representational state transfer (REST) request routing.

Distributed processing systems handle many tasks and requests, such as REST requests. These requests are routed among a plurality of virtual processing systems executing on physical processing systems within the distributed processing system.

SUMMARY

According to examples of the present disclose, techniques including methods, systems, and/or computer program products for routing a representational state transfer (REST) request among a plurality of virtual processing systems are provided. An example computer-implemented method may include: receiving, at a load balancer, the REST request; assigning, by the load balancer, the REST request to one of a plurality of web servers, each of the plurality of web servers executing on a virtual processing system; routing, by the one of the plurality of web servers, the REST request to one of the plurality of virtual processing systems; and storing, by the one of the plurality of web servers, state information regarding the REST request to a data store.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

In current implementations, distributed processing systems utilize at least two instances of a web server executing on each physical processing system to provide routing of REST requests. While this approach provides redundancy, it utilizes additional system resources.

Various implementations are described below by referring to several examples of representational state transfer (REST) routing among a plurality of virtual processing systems. The present techniques route the REST requests using a single web server executing on each physical processing system to route the REST requests among a plurality of virtual processing systems.

In some implementations, the present techniques reduce the number of web servers executing on each physical processing system. Doing so reduces system resources (thus, freeing the system resources for other purposes). The addition of a load balancer enables distribution of the REST requests among the web servers. The present techniques remove the existing single point of failure prevalent in previous implementations while using the minimal number of duplicated web servers. This provides highly available access for REST request processing across the distributed system. These and other advantages will be apparent from the description that follows.

Figure 1A:
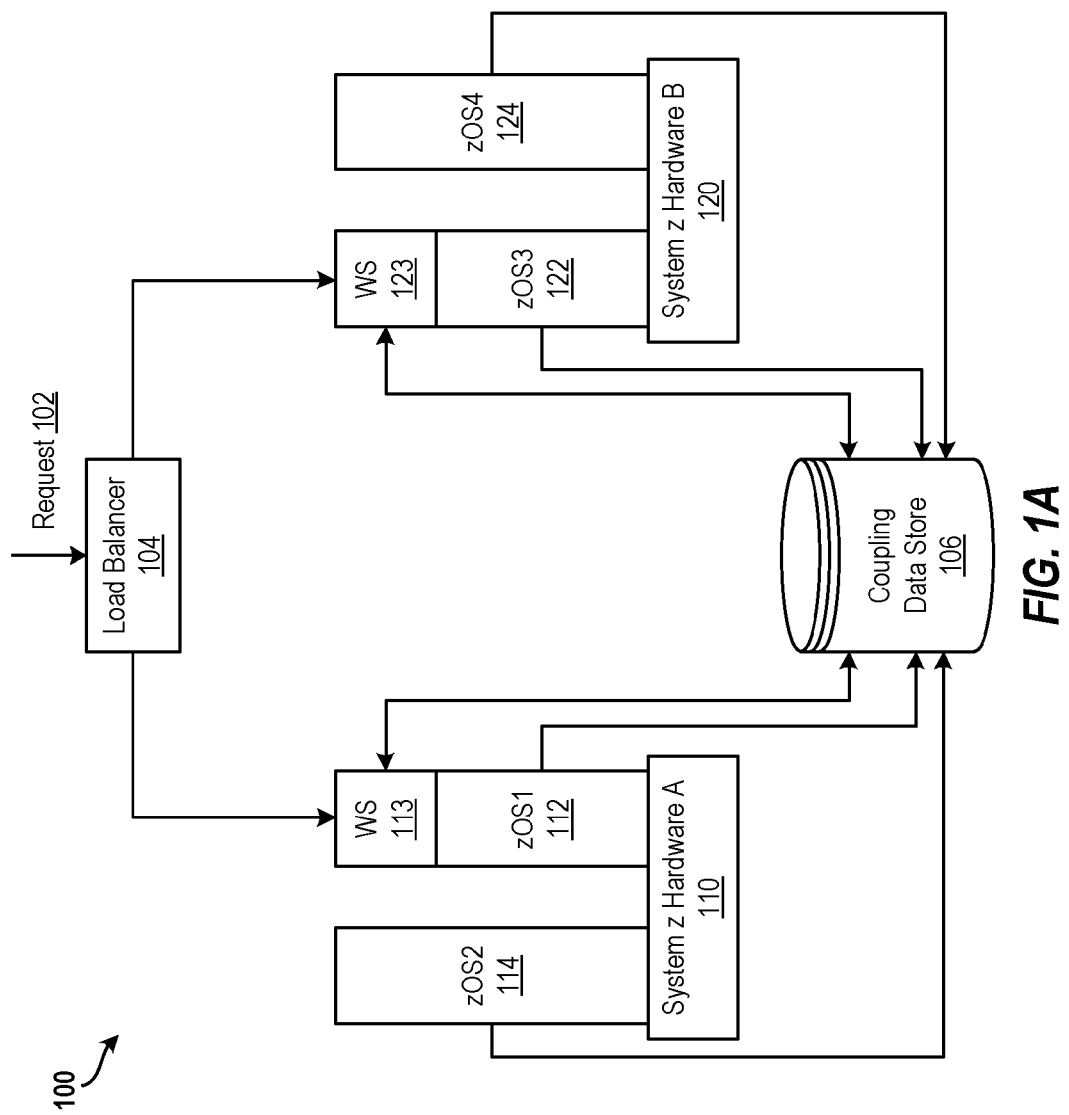
FIGS. 1A and 1B illustrate block diagrams of an environment for routing representational state transfer requests according to examples of the present disclosure.
Figure 1B:
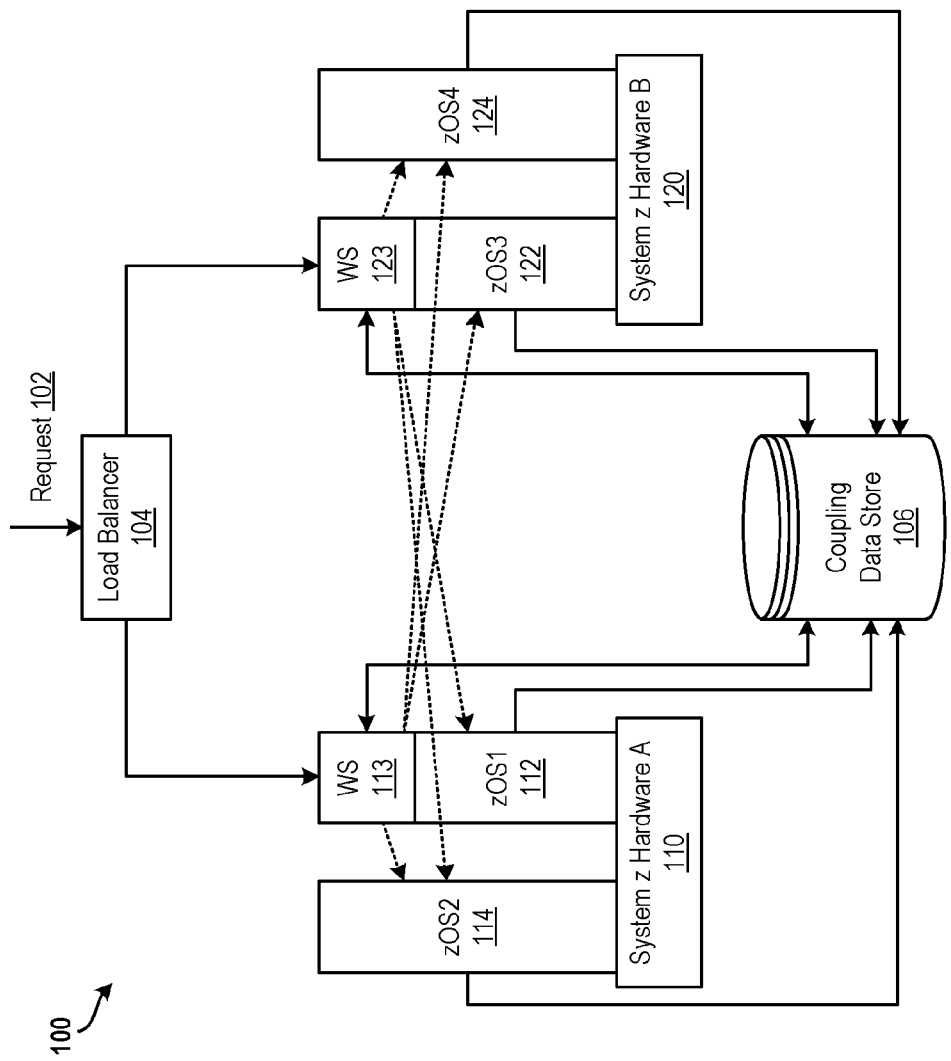

FIGS. 1A and 1B illustrate block diagrams of an environment 100 for routing representational state transfer requests according to examples of the present disclosure. In particular, the environment 100 includes a load balancer 104, a physical processing system 110, a physical processing 120, and a coupling data store 106. The physical processing system 110 includes two virtual processing systems designated as a first operating system (OS1) 112 and a second operating system (OS2) 114. A web server 113 runs on the OS1 112. Similarly, the physical processing system 120 also includes two virtual processing systems designated as a third operating system (OS3) 122 and a fourth operating system (OS4) 124. A web server 123 runs on the OS3 122.

According to aspects of the present disclosure, the physical processing systems 110, 120 may be z/Architecture compatible and capable of executing instances of the z/Operating System (z/OS), designed and manufactured by International Business Machines (IBM). In additional examples, other architectures and/or operating systems may be implemented.

The load balancer 104 receives a request 102, which may be a representational state transfer (REST) request. The load balancer 104 assigns the request 102 to one of the web servers 113, 123 running on OS1 112 and OS 3 122 respectively. It should be appreciated that, although additional web servers may be implemented, a single web server per physical processing system (as illustrated in FIGS. 1A and 1B) is possible according to aspects of the present disclosure. According to aspects of the present disclosure, the web servers 113, 123 may utilize WebSphere Liberty Profile (WLP) and WebSphere Optimized Local Adapters (WOLA) executing on the respective operating systems. In such examples, the WLP receives the request 102 from the load balancer 104 and forwards the request to the WOLA.

The load balancer 104 assigns the request 102 based on, for example, a round-robin scheduling scheme, an available load capacity of the web servers 113, 123, or other criteria. In an example of round-robin scheduling, a first request is assigned to the web server 113, a second request is assigned to the web server 123, a third request is assigned to the web server 113, a fourth request is assigned to the web server 123, and so on. In an example of availability load capacity, a request is assigned to one of the web servers 113, 123 based on an availability load capacity of the web server, the operating systems running on the physical processing system, and/or the physical processing system itself. In some examples, the web servers 113, 123 stores and retrieves state information related to the request 102 to the coupling data store 106.

In an example in which the web server 113 receives the request from the load balancer 104, the web server 113 routes the request 102 to one of the virtual processing systems (e.g., OS1 112, OS2 114, OS3 122, and/or OS4 124). Similarly, in another example in which the web server 123 receives the request from the load balancer 104, the web server 123 routes the request 102 to one of the virtual processing systems (e.g., OS1 112, OS2 114, OS3 122, and/or OS4 124). The various routing from the web servers 113, 123 to the virtual processing systems (e.g., OS1 112, OS2 114, OS3 122, and/or OS4 124) is illustrated in FIG. 1B. It should be appreciated that a web server may route the request 102 to any of the virtual processing systems, not only the virtual processing system on which the web server is executing.

In an example using the WLP and WOLA, the WOLA routes the request 102 to an appropriate virtual processing system that can fulfill the request 102, for example, using cross-system coupling facility (XCF) communication services. Once the virtual processing system receives the request 102 and processes the request 102, the virtual processing system may transmit a response to the web server. For example, if the web server 113 routes the request 102 to the OS2, the OS2 may transmit a response to the web server 113 upon completion of the request. The web servers 113, 123 can then write state information to the coupling data store 106 upon receiving the response from the virtual processing systems (e.g., OS1 112, OS2 114, OS3 122, and/or OS4 124). Additionally, the response can be sent back to the requester.

Figure 2:
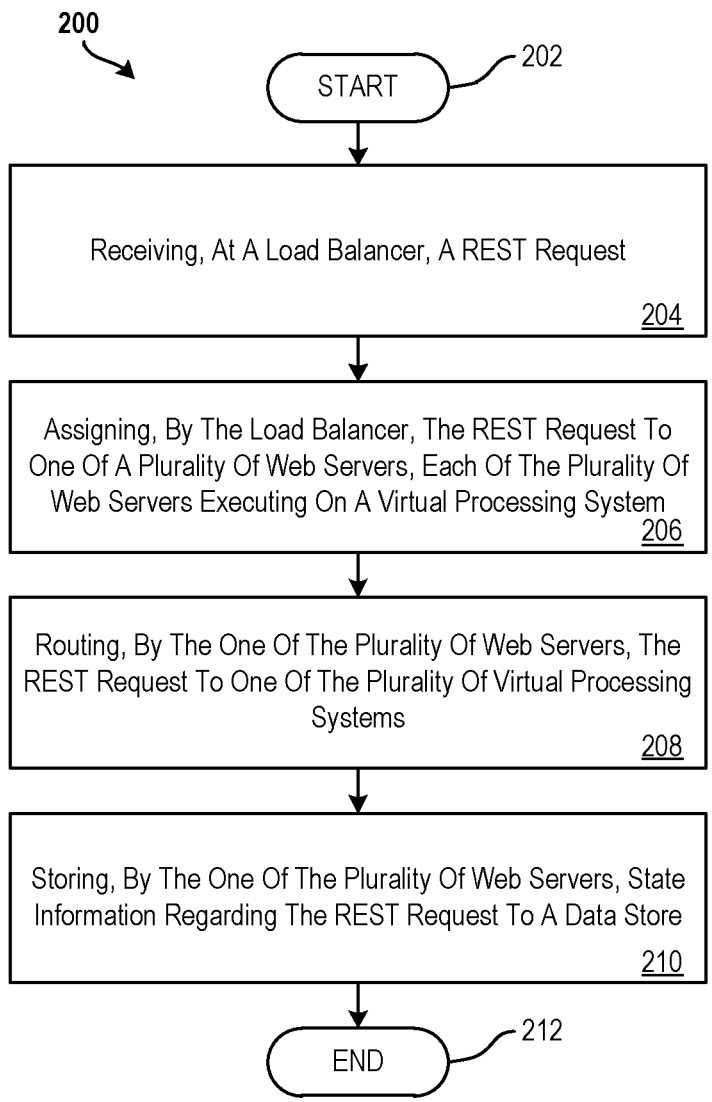
FIG. 2 illustrates a flow diagram of a method for routing a representational state transfer (REST) request among a plurality of virtual processing systems according to examples of the present disclosure.

FIG. 2 illustrates a flow diagram of a method for routing a representational state transfer (REST) request amount a plurality of virtual processing systems according to examples of the present disclosure. The method 200 may be performed, for example, by the systems of FIGS. 1A and 1B, and reference is made thereto in describing the method 200. The method 200 begins at block 202 and continues to block 204.

At block 204, the method 200 includes a load balancer (e.g., the load balancer 104 of FIGS. 1A and 1B) receiving a REST request.

At block 206, the method 200 includes the load balancer assigning the REST request to one of a plurality of web servers (e.g., the web servers 113, 123 of FIGS. 1A and 1B). Each of the plurality of web servers executes on a virtual processing system (e.g. the physical processing systems 110, 120 of FIGS. 1A and 1B). According to aspects of the present disclosure, a single web system may execute on each physical processing system.

At block 208, the method 200 includes the one of the plurality of web servers to which the request was assigned routing the REST request to one of the plurality of virtual processing systems (e.g., OS1 112, OS2 114, OS3 122, and/or OS4 124 of FIGS. 1A and 1B). The routing may be based on an available load capacity of the virtual processing systems (i.e., how much capacity a virtual processing system has available to process an additional request), based on a type of the virtual processing system (i.e., whether the type of virtual processing system is suitable to process the request), based on previous state information stored in the data store, etc.

At block 210, the method 200 includes the one of the plurality of web servers to which the request was assigned storing state information regarding the REST request to a data store (e.g., coupling data store 106). The method 200 continues to block 212 and terminates.

Additionally, the web servers may store state information regarding a response received from one of the virtual processing systems executing the request to the data store. This enables the routing to be performed based on a previous state stored in the data store. For example, a previous state stored in the data store may indicate that a next REST request is associated with the previous REST request. This enables the web server to route the REST request to the same virtual processing system as the previous REST request. In some examples, routing a first REST request to a first virtual processing system and routing a second REST request to the first virtual processing system may occur when the previous state of the first REST request indicates that the second REST request is a continuation of the first REST request, and the prior request was successful. However, in another example, when the previous state of the first REST request indicates that the second REST request is independent of the first REST request, the first REST request is routed to a first virtual processing system and the second REST request to a second virtual processing system.

Additional processes also may be included, and it should be understood that the processes depicted in FIG. 2 represent illustrations, and that other processes may be added or existing processes may be removed, modified, or rearranged without departing from the scope and spirit of the present disclosure.

In one or more examples, the virtual processing systems could be running the z/OS® operating system. In the interactive command requests and responses sessions, two sequences of requests are issued. The two sequences of commands can be issued through the operator console or time sharing option (TSO) by the same user logged onto one session of a z/OS® system, by two different users logged onto two different sessions the same z/OS® system, or by two different users logged onto two different sessions on two different z/OS® systems. The following pseudo-commands represents an example:

Seq 1, step 1—Request: Delete dataset A.
Seq 2, step 1—Request: Print the result of Job 9.
Seq 1, step 2—Response: Job1, Job2 and Job 3 are currently using the content of the dataset. Terminate all jobs and delete the dataset immediately (Y/Wait/Cancel)? Response ID: Job Manager, ID1234.
Seq 2, step 2—Response: Print temp space full, clean up print temp space? Response ID: Storage Manager, Print Spool, ID96.
Seq 1, step 3—Request: Response to: Job Manager, ID1234, Cancel.
Seq 2, step 3—Request: Response to: Storage Manager, Print Spool, ID96, Yes.

In an example, zOS1 112, zOS2 114, zOS3 122, and zOS4 124 are the systems available. zOS1 112 and zOS2 114 share the dataset A. A user can issue commands to either ZOS1 or ZOS2, and delete the dataset A. In this case, ZOS1 is the only system responsible for printing.

When the above sequences are issued with REST APIs, one request sequence is connected to the either one of the two web server such as WLPs (Websphere Liberty Profile) running on OS1 and OS3. The WLP translates the request into a command that the WOLA can understand and translates the response into a simplified response for the REST API response.

In this example, sequence 1 is initiated from Caller1 to WLP on OS3 with the following example JavaScript object notation (JSON) in step 1:

```
{
Function: "Delete dataset"
Target: "ZOS1"
Param1: "A"
}
```
After OS1 processes the request, OS1 provides a response to the WLP through the WOLA. The WLP maps the response ID of "Job Manager, ID1234" on "OS1" to a unique sequence number (e.g., 1003), and store the mapping in the data store such as the coupling dataset. The following example JSON response is returned from the WLP on OS3 to the Caller1 in step 2:

```
{
Message: "Job1, Job2 and Job 3 are currently using the conent of the dataset. Terminate all jobs and delete the dataset immediately (Y/Wait/Cancel)?"
ResponseId: 1003
}
```

When the REST request comes back for the response 1003, the following example JSON is sent from Caller1 to WLP on OS3 in step 3:

```
{
ResponseMessage: "Cancel"
ResponseId: 1003
}
```

The WLP on OS3 maps the responseId to "Job Manager, ID1234" on "OS1." The WLP on OS3 will base on application specific knowledge, and issue a response to OS1 using application specific mechanism.

In another example, the load balancer could route the request from Caller1 to the WLP on OS3 during step 1. Additionally, the load balancer routes the request from Caller1 to the WLP on OS1 during step 2. This could due to the OS3 system being down or due to another load balancing decision such as OS1 having more available processing resources than OS3. When the step 2 request is routed to OS1, OS1 looks up the ResponseId from the coupling dataset and handles the request accordingly.

In another extended example, OS1 that accepts "disconnect" command is not available at step 3. When the WLP on OS3 receives the REST request at step 3, it determines that OS1 previously handled this command and is not available. The WLP on OS3 then further determines that OS2 can be used to continue the command sequence 1. The WLP on OS3 is based on application specific knowledge and issues a response to OS1 through OS2 using application specific mechanism.

In the above example, the data stored in the coupling dataset contains application specific knowledge, relationship between multiple nodes, and maps to unique IDs. The web server is responsible to hide complexity by translating the external interface to the interface of the z/OS® system or application. State information is used to perform this translation and kept in a highly available data store, for example.

Figure 3:
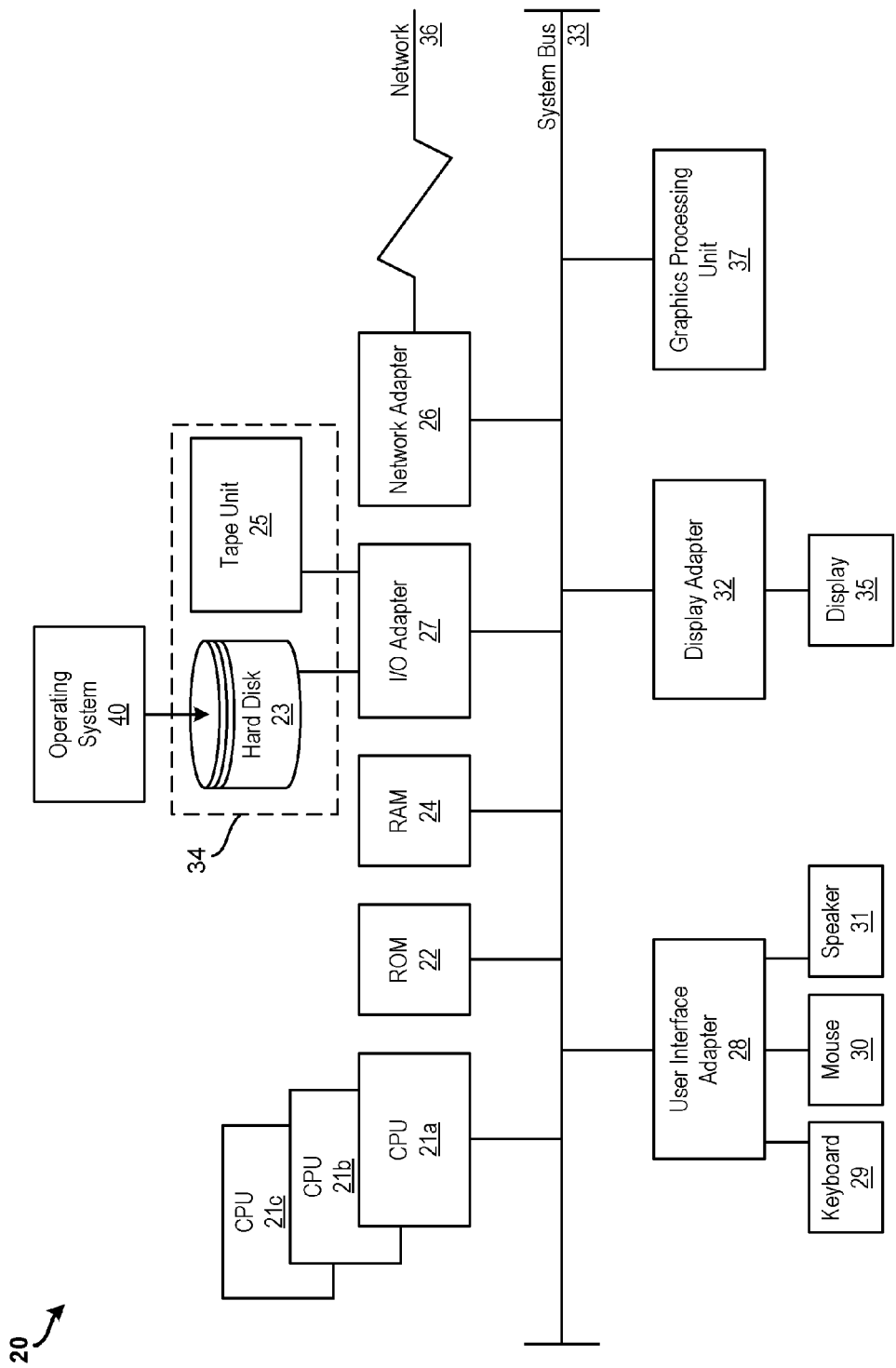
FIG. 3 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 3 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

In other examples, the present disclosure may be implemented on cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
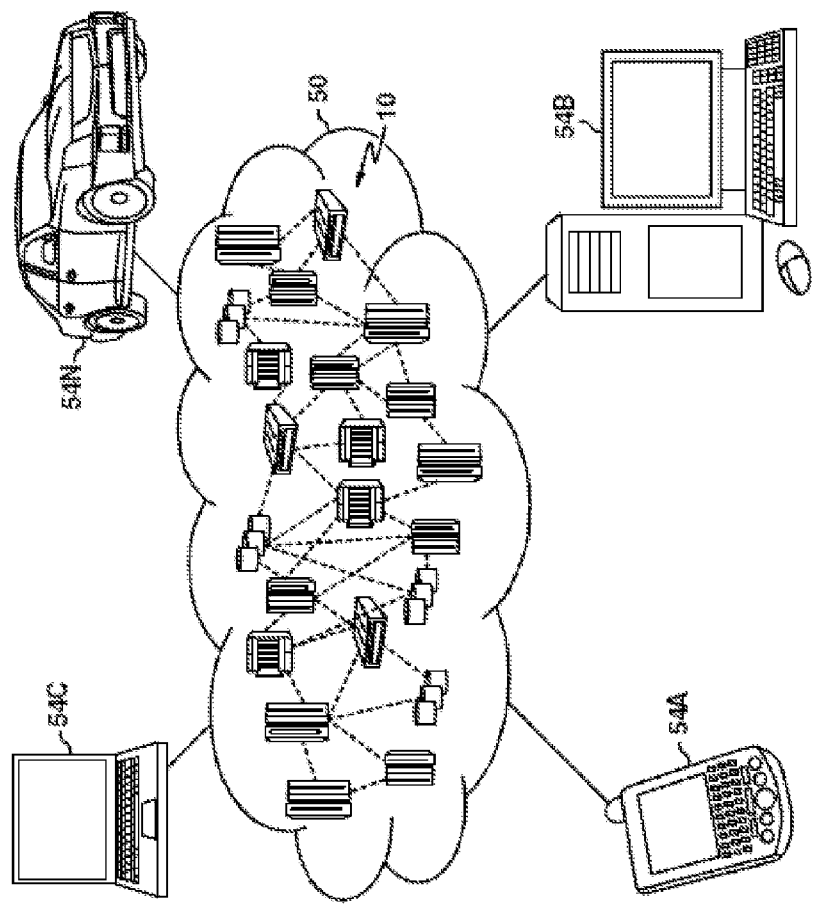
FIG. 4 illustrates a cloud computing environment according to examples of the present disclosure.

Referring now to FIG. 4, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
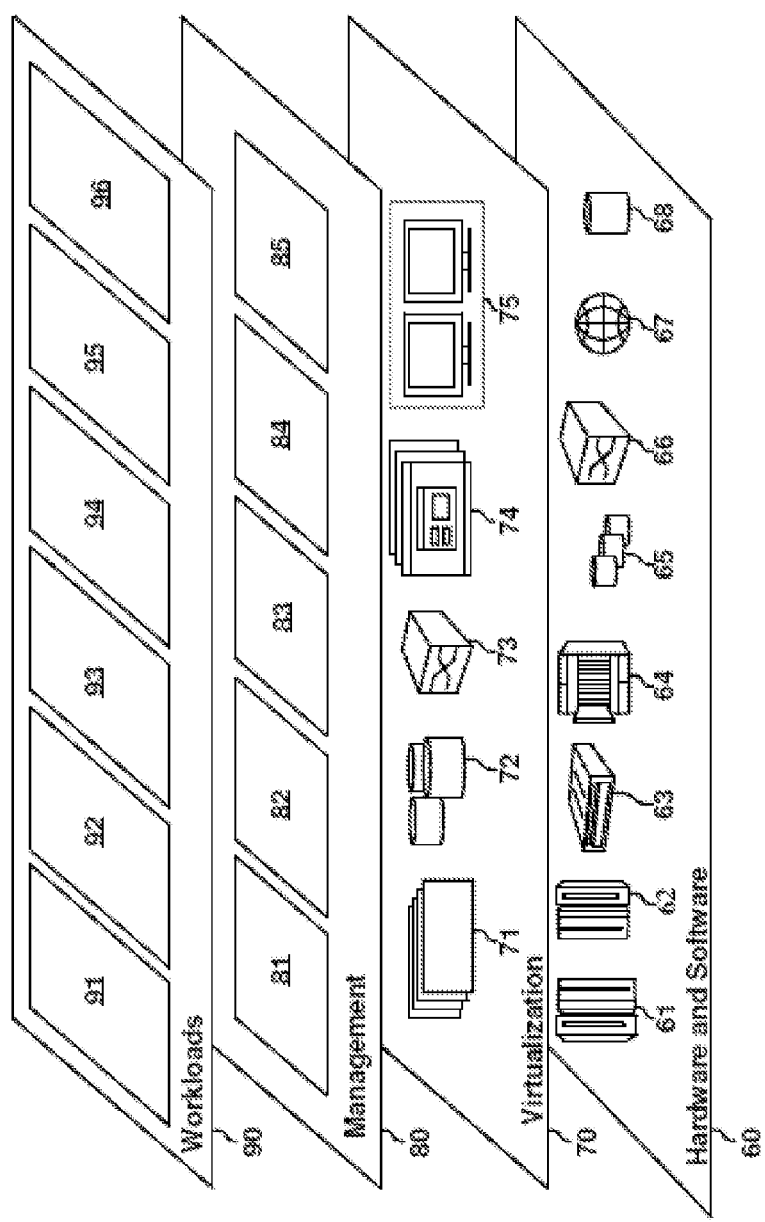
FIG. 5 illustrates abstraction model layers according to examples of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and routing REST requests among a plurality of virtual processing systems 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for routing a representational state transfer (REST) request among a plurality of virtual processing systems, the method comprising:
   receiving, at a load balancer, the REST request;
   assigning, by the load balancer, the REST request to one of a plurality of web servers, each of the plurality of web servers executing on a virtual processing system;
   routing, by the one of the plurality of web servers, the REST request to one of the plurality of virtual processing systems, wherein the one of the plurality of web servers utilizes a WebSphere Liberty Profile module (WLP) and a WebSphere Optimized Local Adapters (WOLA) module, wherein the WLP module receives the REST request from the load balancer and forwards the REST request to the WOLA module, and wherein the WOLA module routes the REST request to the one of the plurality of virtual processing systems; and
   storing, by the one of the plurality of web servers, state information regarding the REST request to a data store.

2. The computer-implemented method of claim 1, wherein the assigning is performed based on a round-robin scheduling scheme.

3. The computer-implemented method of claim 1, wherein the assigning is performed based on an available load capacity of the plurality of web servers.

4. The computer-implemented method of claim 1, wherein the routing is based on a previous state stored in the data store, the previous state being associated with the REST request.

5. The computer-implemented method of claim 4, wherein routing the REST request to one of the plurality of virtual processing systems further comprises:
   routing a first REST request to a first virtual processing system and routing a second REST request to the first virtual processing system when the previous state of the first REST request indicates that the second REST request is a continuation of the first REST request.

6. The computer-implemented method of claim 4, wherein routing the REST request to one of the plurality of virtual processing systems further comprises:
   routing a first REST request to a first virtual processing system and routing a second REST request to a second virtual processing system when the previous state of the first REST request indicates that the second REST request is independent of the first REST request.

7. The computer-implemented method of claim 1, wherein the routing is based on an available load capacity of the plurality of virtual processing systems.

8. The computer-implemented method of claim 1, wherein the routing is based on a type of the plurality of virtual processing systems.

9. A system for routing a representational state transfer (REST) request among a plurality of virtual processing systems, the system comprising:
   a memory having computer readable instructions; and
   a processing device for executing the computer readable instructions, the computer readable instructions comprising:
      receiving, at a load balancer, the REST request;
      assigning, by the load balancer, the REST request to one of a plurality of web servers, each of the plurality of web servers executing on a virtual processing system;
      routing, by the one of the plurality of web servers, the REST request to one of the plurality of virtual processing systems, wherein the one of the plurality of web servers utilizes a WebSphere Liberty Profile module (WLP) and a WebSphere Optimized Local Adapters (WOLA) module, wherein the WLP module receives the REST request from the load balancer and forwards the REST request to the WOLA module, and wherein the WOLA module routes the REST request to the one of the plurality of virtual processing systems; and
      storing, by the one of the plurality of web servers, state information regarding the REST request to a data store.

10. The system of claim 9, wherein the assigning is performed based on a round-robin scheduling scheme.

11. The system of claim 9, wherein the assigning is performed based on an available load capacity of the plurality of web servers.

12. The system of claim 9, wherein the routing is based on a previous state stored in the data store, the previous state being associated with the REST request.

13. The system of claim 12, wherein routing the REST request to one of the plurality of virtual processing systems further comprises:
   routing a first REST request to a first virtual processing system and routing a second REST request to the first virtual processing system when the previous state of the first REST request indicates that the second REST request is a continuation of the first REST request.

14. The computer-implemented method of claim 12, wherein routing the REST request to one of the plurality of virtual processing systems further comprises:
   routing a first REST request to a first virtual processing system and routing a second REST request to a second virtual processing system when the previous state of the first REST request indicates that the second REST request is independent of the first REST request.

15. The computer-implemented method of claim 9, wherein the routing is based on an available load capacity of the plurality of virtual processing systems.

16. The computer-implemented method of claim 9, wherein the routing is based on a type of the plurality of virtual processing systems.

17. A computer program product for routing a representational state transfer (REST) request among a plurality of virtual processing systems, the computer program product comprising:

a non-transitory computer readable storage medium having program instructions embodied therewith, the program instructions executable by a processing device to cause the processing device to:
- receiving, at a load balancer, the REST request;
- assigning, by the load balancer, the REST request to one of a plurality of web servers, each of the plurality of web servers executing on a virtual processing system;
- routing, by the one of the plurality of web servers, the REST request to one of the plurality of virtual processing systems, wherein the one of the plurality of web servers utilizes a WebSphere Liberty Profile module (WLP) and a WebSphere Optimized Local Adapters (WOLA) module, wherein the WLP module receives the REST request from the load balancer and forwards the REST request to the WOLA module, and wherein the WOLA module routes the REST request to the one of the plurality of virtual processing systems; and
- storing, by the one of the plurality of web servers, state information regarding the REST request to a data store.

18. The computer program product of claim 17, wherein the assigning is performed based on a round-robin scheduling scheme.

19. The computer program product of claim 17, wherein the assigning is performed based on an available load capacity of the plurality of web servers.

20. The computer program product of claim 17, wherein the routing is based on a previous state stored in the data store, the previous state being associated with the REST request.

* * * * *